United States Patent
Hamery (10) Patent No.: US 7,039,245 B1
(45) Date of Patent: May 2, 2006

(54) PROCESSING OF DIGITAL PICTURE DATA IN A DECODER

(75) Inventor: Dominique Hamery, Rueil Malmaison (FR)

(73) Assignee: Canal + Technologies, Paris (FR)

( * ) Notice: Subject to any disclaimer, the term of this patent is extended or adjusted under 35 U.S.C. 154(b) by 0 days.

(21) Appl. No.: 09/622,246

(22) PCT Filed: Feb. 8, 1999

(86) PCT No.: PCT/IB99/00288

§ 371 (c)(1),
(2), (4) Date: Aug. 15, 2000

(87) PCT Pub. No.: WO99/41908

PCT Pub. Date: Aug. 19, 1999

(30) Foreign Application Priority Data

Feb. 16, 1998 (EP) .................................. 98400367

(51) Int. Cl.
*G06K 9/36* (2006.01)
(52) U.S. Cl. ..................................... 382/233
(58) Field of Classification Search ................. 382/232, 382/233, 240; 348/407.1–416.1, 422.1, 580; 375/240.22, 240.23
See application file for complete search history.

(56) References Cited

U.S. PATENT DOCUMENTS

| | | | | |
|---|---|---|---|---|
| 4,463,380 A | * | 7/1984 | Hooks, Jr. ................... | 348/580 |
| 4,868,653 A | * | 9/1989 | Golin et al. ............ | 375/240.23 |
| 4,876,597 A | * | 10/1989 | Roy et al. .................... | 348/143 |
| 4,924,303 A | * | 5/1990 | Brandon et al. ............ | 725/116 |
| 5,181,105 A | * | 1/1993 | Udagawa et al. ........... | 358/520 |
| 5,633,654 A | | 5/1997 | Kennedy, Jr. et al. ...... | 345/114 |
| 5,646,992 A | * | 7/1997 | Subler et al. ................. | 705/53 |
| 5,682,441 A | * | 10/1997 | Ligtenberg et al. ......... | 382/232 |
| 5,699,458 A | * | 12/1997 | Sprague ...................... | 382/250 |
| 5,831,678 A | * | 11/1998 | Proctor .................. | 375/240.22 |
| 5,892,847 A | * | 4/1999 | Johnson ...................... | 382/232 |
| 5,893,095 A | * | 4/1999 | Jain et al. ...................... | 707/6 |
| 5,903,816 A | * | 5/1999 | Broadwin et al. .......... | 725/110 |
| 5,956,026 A | * | 9/1999 | Ratakonda .................. | 345/723 |
| 6,041,143 A | * | 3/2000 | Chui et al. .................. | 382/232 |
| 6,154,771 A | * | 11/2000 | Rangan et al. .............. | 709/217 |

FOREIGN PATENT DOCUMENTS

| | | |
|---|---|---|
| EP | 0 622 774 A1 | 11/1994 |
| EP | 0 782 332 A2 | 7/1997 |
| HU | 219 533 B | 5/1995 |
| WO | 96/37074 | 11/1996 |
| WO | 97/02700 | 1/1997 |
| WO | 98/00976 | 1/1998 |

* cited by examiner

Primary Examiner—Jose L. Couso
(74) Attorney, Agent, or Firm—Osha Liang LLP (57) ABSTRACT

A decoder for a digital audiovisual transmission system, the decoder comprising a processor means for decompressing and displaying compressed still picture data and a memory (66, 67) characterised in that the memory (66, 67) comprises a storage memory (66) allocated to receive from the processor decompressed digital image data representing a plurality of still picture images (63, 64, 65) and at least one display memory (67) adapted to hold contemporaneously data representing multiple still picture images (68, 69, 70, 71) readable by the processor means prior to display, data representing the plurality of images being copied from the storage memory (66) to the display memory (67) for subsequent display.

30 Claims, 5 Drawing Sheets

PROCESSING OF DIGITAL PICTURE DATA IN A DECODER

The present invention relates to a decoder for a digital audiovisual transmission system, the decoder comprising a processor means for decompressing and displaying compressed digital picture data and a memory means.

Broadcast transmission of digital data is well-known in the field of pay TV systems, where scrambled audiovisual information is sent, usually by a satellite or satellite/cable link, to a number of subscribers, each subscriber possessing a decoder capable of descrambling the transmitted program for subsequent viewing. Terrestrial digital broadcast systems are also known. Recent systems have used the broadcast link to transmit other data, in addition to or as well as audiovisual data, such as computer programs or interactive applications.

In the most basic level of functionality of such systems, digital audio and video data relating to the televised program is transmitted in a compressed format, for example, in accordance with the MPEG-2 compression standard. The decoder receives and decompresses this data in order to regenerate the televised program.

In addition to simple televised program data, it is becoming increasingly common for the decoder to be required to handle other compressed image or graphic data. For example, in the case where the decoder includes web browser capabilities, the processor of the decoder may be required to receive and decompress downloaded digital picture data, for example, still video pictures, graphic icons etc. This picture information may be displayed over the normal televised program images.

Such still or moving picture data may be typically received in one of any number of compressed formats that are currently used in the context of PC based web browsers. For example, a picture may be formatted and compressed according to the well-known GIF or PNG standards, where an image is described by a colour look-up table defining a table of colours and a matrix of pixel values referring to this table, the matrix data being compressed according to a known compression procedure to prepare the GIF/PNG picture. Alternatively, the picture may be formatted and compressed as a still MPEG or JPEG image, in which each pixel is directly associated with a red/green/blue colour value.

It is an object of the present invention to provide a means of efficiently handling such downloaded still picture files.

According to the present invention, there is provided a decoder for a digital audiovisual transmission system, the decoder including a processor for decompressing and displaying compressed still picture data and a memory, characterised in that the memory comprises a storage memory allocated to receive from the processor decompressed data representing a plurality of still picture images, and at least one display memory adapted to hold data representing multiple still picture images readable by the processor prior to display, the data representing the plurality of still picture images being copied from the storage memory to the display memory for subsequent display.

This division of the memory into a storage and display memory areas introduces a degree of flexibility into the display of still image data, in particular by permitting data representing a given still picture image to be held at the same time in both the storage and display means. Data representing one or more still pictures may be held indefinitely in the storage memory as long as there is a possible requirement for this data, even after the picture has been removed from the screen by deletion of the data from the display memory.

In some instances, decompressed image data may simply be copied "as is" into the display memory. However, in some cases, the digital image data copied from the storage memory into the display memory is modified or duplicated during the copying step, for example, in order to resize the digital image or to copy the same image a number of times into the display memory.

Preferably, the processor means is adapted to process image data in the display memory as one layer amongst a plurality of layers superimposed one over the other when displayed.

As discussed above, picture data may be superimposed in a higher layer over, for example, audiovisual information representing normal televised images. However, in one embodiment, the image data in the display memory may be displayed in a layer normally used by the processor means to display broadcast audiovisual information. This may be the case, for example, where the decoder switches from a "television" mode, in which a broadcast emission is displayed, to a "web browser" mode, in which downloaded picture data from the internet is displayed in place of normal televised programmes.

Advantageously, the memory comprises a second display memory readable by the graphic processor means and corresponding to a second layer of displayed image data, data being copied from the storage memory to the second display memory for subsequent display in the second layer of image data.

Again, as before, the digital image data copied from the storage memory to the second display memory may be modified during the copying step.

In one embodiment, for example, where the decoder switches between a television and browser mode, the image data in the second display memory may be displayed in the lowermost background layer normally used by the processor means to display broadcast still audiovisual information.

Preferably, partial image data is copied from the storage memory to a display memory under the control of an application running within the decoder so as to permit display of part of an image. This may be desirable, for example, where the decompression and downloading of an image into the storage memory by the processor proceeds in a number of stages.

In one embodiment, image data is copied from the storage memory into a first or second display memory under control of a high level application running in the processor. Alternatively, this process may be handled automatically by a lower level application associated for example with the general handling of received image data.

Compressed digital picture data is preferably stored in a buffer memory prior to decompression by the processor. It is not necessary that this buffer means be a single integral block of memory particularly if the data arrives in a number of blocks of information. In particular, in one embodiment, the buffer comprises a plurality of buffer memory elements. Each memory element may correspond, for example to a block of data downloaded in the decoder.

Preferably, the decompression and transfer of image data from the buffer memory elements to the storage memory, and from the storage memory to a display memory, is controlled by the processor such that image information present in the storage memory is transferred to the display memory at the end of the decompression of the contents of each buffer element.

It may be the case, for example, that information corresponding to one image will be spread over a number of buffer elements. As each buffer is emptied and decompressed, the information ready for display is transferred immediately to the display memory, enabling a partial display of the complete image.

In addition, or alternatively, the decompression and transfer of a group of images in a single image file from the buffer memory to the storage memory, and from the storage memory to a display memory, is controlled by the processor such that image information is transferred from the storage memory to the display memory at the end of the decompression of each image in the image file.

As discussed above, image data may be sent in any number of formats. In one embodiment, the processor is adapted to decompress picture data sent in a compression standard, such as GIF or PNG, that uses a colour look-up table.

In addition or alternatively, the processor is adapted to decompress picture data sent in a compression standard, such MPEG or JPEG, that uses a red/blue/green colour value associated with each pixel.

All functions of decompression, display etc. may be integrated in a single processor. Alternatively, the processor in the decoder need not necessarily be embodied in a single chip but may be divided, for example, into a general processor handling data decompression and a graphic processor for preparing the decompressed data for display.

Similarly, whilst the application may refer to a storage memory, a display memory etc. it is to be understood that these need not correspond to physically separate memory devices (RAM, ROM, FLASH, etc.) but may correspond to one or more areas allocated for this purpose by a controlling application and divided between one or more physical memory devices.

The present invention has been discussed above in relation to a decoder apparatus. The present invention equally extends to a method of digital image processing within a decoder, corresponding to the general and preferred aspects of the invention discussed above.

In the context of the present application the term "digital audiovisual transmission system" refers to all transmission systems for transmitting or broadcasting primarily audiovisual or multimedia digital data. Whilst the present invention is particularly applicable to a broadcast digital television system, the present invention may equally be used in filtering data sent by a fixed telecommunications network for multimedia internet applications etc.

Similarly, the term "decoder" is used to apply to an integrated receiver/decoder for receiving and decrypting an encrypted transmission, the receiver and decoder elements of such a system as considered separately, as well as to a receiver capable of receiving non-encrypted broadcasts. The term equally covers decoders including additional functions, such as web browsers, together with decoders integrated with other devices, for example, integrated VHS/decoder devices, digital televisions, or the like.

The term MPEG refers to the data transmission standards developed by the International Standards Organisation working group "Motion Pictures Expert Group" and notably the MPEG-2 standard developed for digital television applications and set out in the documents ISO 13818-1, ISO 13818-2, ISO 13818-3, and ISO 13818-4. In the context of the present patent application, the term includes all variants, modifications or developments of the basic MPEG formats applicable to the field of digital data transmission.

There will now be described, by way of example only, a preferred embodiment of the present invention, with reference to the attached figures, in which.

Figure 1:
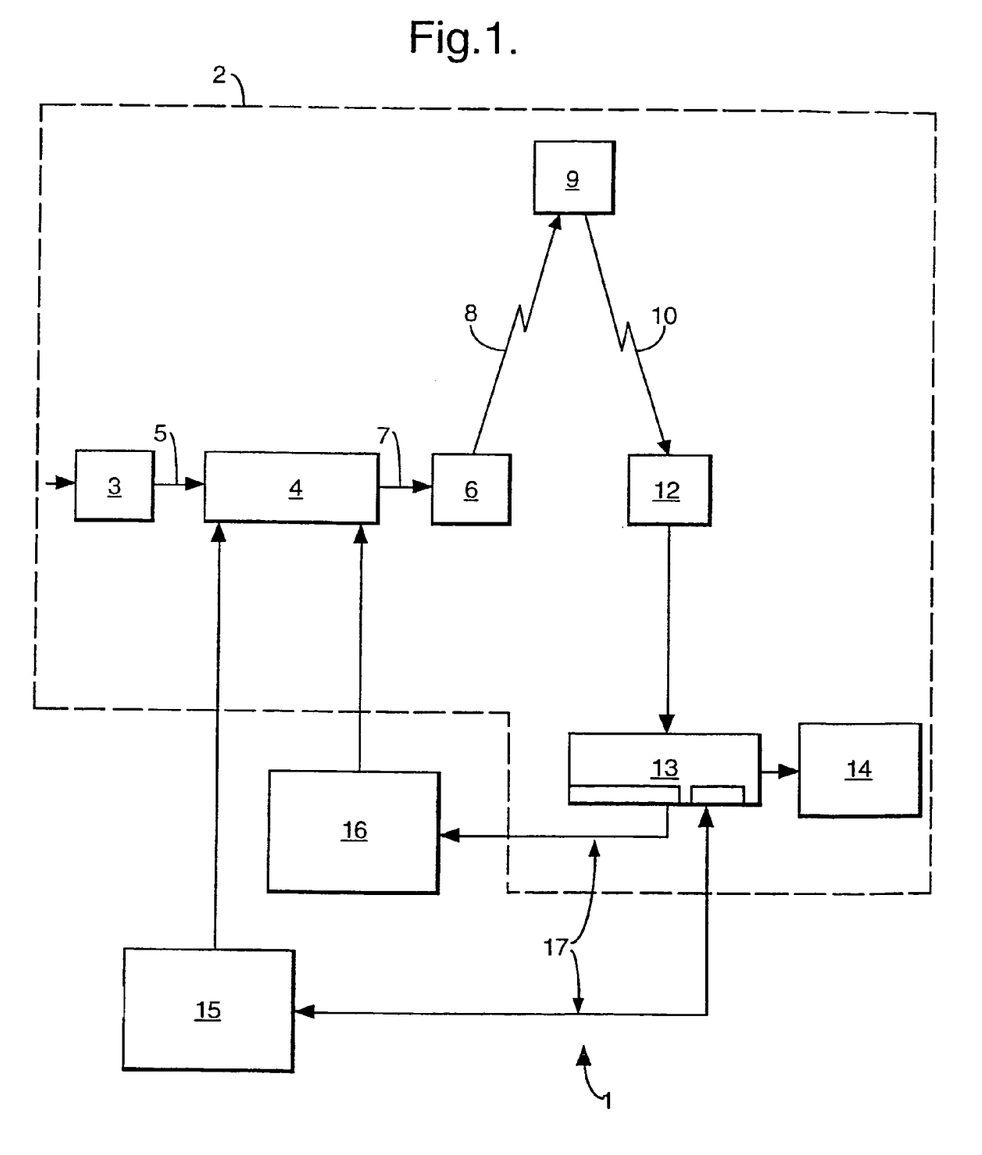
FIG. 1 shows an overview of a digital television system.

An overview of a digital television system 1 according to the present invention is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14.

Other transport channels for transmission of the data are of course possible, such as terrestrial broadcast, cable transmission, combined satellite/cable links, telephone networks etc.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the decoder 13 having access to an equivalent of the exploitation key stored on a smart card inserted in the decoder to decrypt the encrypted control word and thereafter descramble the transmitted data. A paid-up subscriber will receive, for example, in a broadcast monthly ECM (Entitlement Control Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the decoder, enables the end user to interact with various applications via a modem back channel 17. The modem back channel may also be used for communications used in the conditional access system 15. An interactive system may be used, for example, to enable the viewer to communicate immediately with the transmission centre to demand authorisation to watch a particular event, download an application etc.

Figure 2:
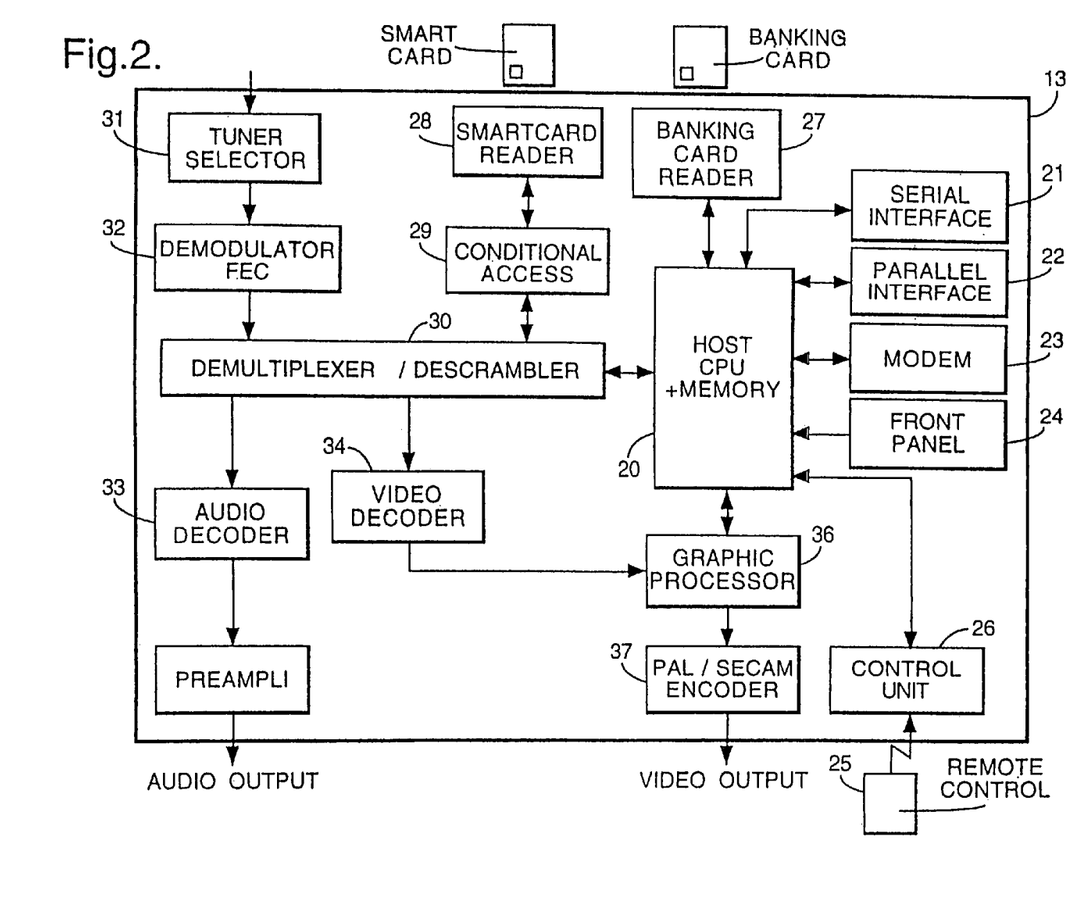
FIG. 2 shows the elements of the receiver/decoder of FIG. 1.

Referring to FIG. 2, the elements of the receiver/decoder 13 or set-top box adapted to be used in the present invention will now be described. The elements shown in this figure will be described in terms of functional blocks.

The decoder 13 comprises a central processor 20 including associated memory elements and adapted to receive input data from a serial interface 21, a parallel interface 22, a modem 23 (connected to the modem back channel 17 of FIG. 1), and switch contacts 24 on the front panel of the decoder.

The decoder is additionally adapted to receive inputs from an infra-red remote control 25 via a control unit 26 and also possesses two smartcard readers 27, 28 adapted to read bank or subscription smartcards 29, 30 respectively. The subscription smartcard reader 28 engages with an inserted subscription card 30 and with a conditional access unit 29 to supply the necessary control word to a demultiplexer/descrambler 30 to enable the encrypted broadcast signal to be descrambled. The decoder also includes a conventional tuner 31 and demodulator 32 to receive and demodulate the satellite transmission before being filtered and demultiplexed by the unit 30.

Processing of data within the decoder is generally handled by the central processor 20. The software architecture of the central processor corresponds to a virtual machine interacting via an interface layer with a lower level operating system implemented in the hardware components of the decoder. This will now be described with reference to FIG. 3.

For the purposes of this description, an application is a piece of computer code for controlling high level functions of the receiver/decoder 13. For example, when the end user positions the focus of a remote controller on a button object seen on the screen of the television set and presses a validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 13, or broadcast and downloaded into the RAM or FLASH memory of the receiver/decoder 13.

Applications are stored in memory locations in the receiver/decoder 13 and represented as resource files. The resource files comprise graphic object description unit files, variables block unit files, instruction sequence files, application files and data files.

The receiver/decoder contains memory divided into a RAM volume, a FLASH volume and a ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

Figure 3:
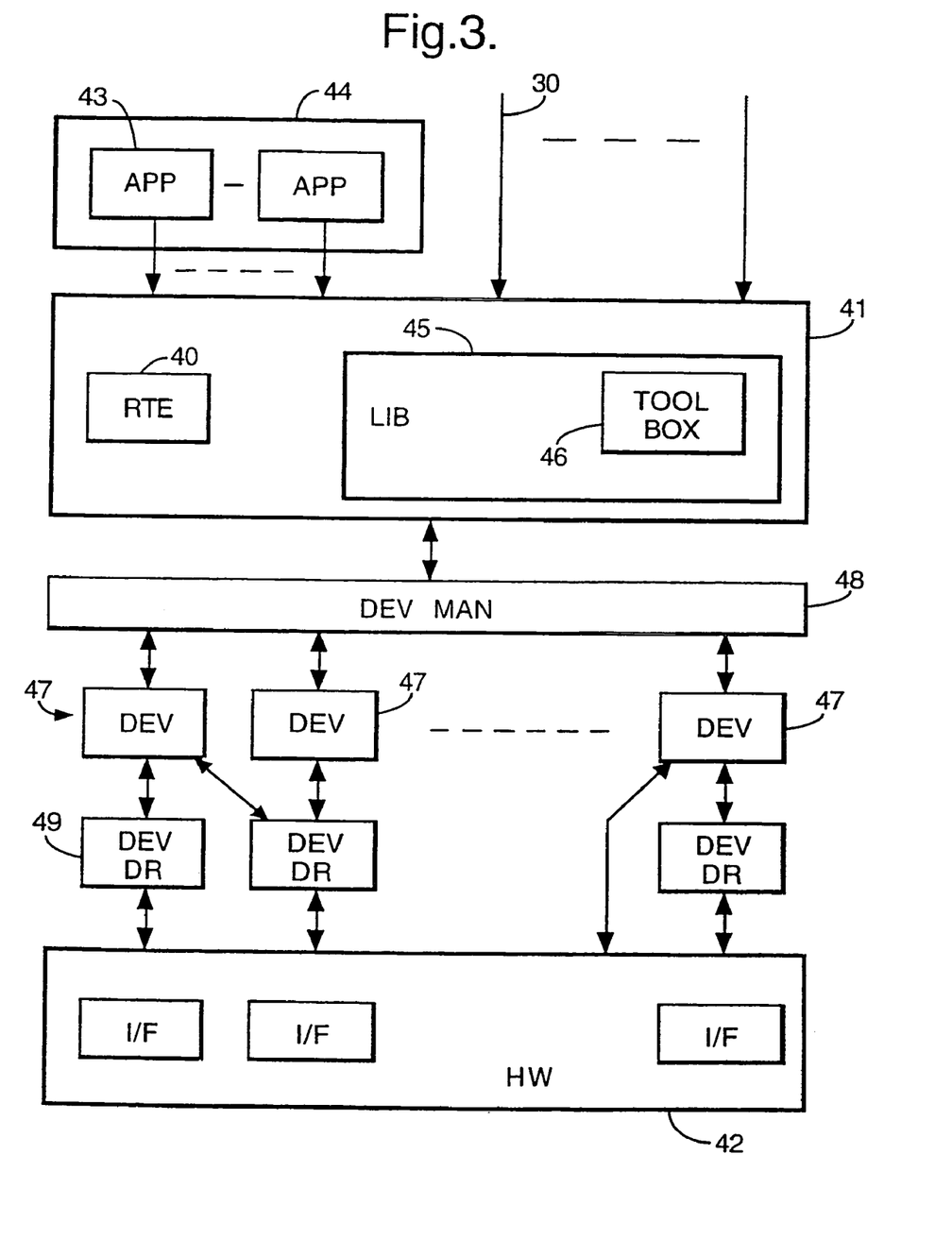
FIG. 3 shows a block diagram of the computer system of the receiver/decoder.

Referring to FIG. 3, the computer system can be regarded as centred on a run time engine 40 forming part of a virtual machine 41. This is coupled to applications on one side (the "high level" side), and, on the other side (the "low level" side), via various intermediate logical units discussed below, to the receiver/decoder hardware 42. The receiver/decoder hardware can be regarded as including various ports corresponding to the functional blocks discussed in relation to FIG. 2 (the interface 26 for the handset 25, the MPEG stream interface 30, the serial interface 21, the parallel interface 22, the interfaces to the card readers 27, 28, and the interface 23 to the modemmed back channel 17).

Various applications 43 are coupled to the virtual machine 41. Some of the more commonly used applications may be more or less permanently resident in the system, as indicated at 44, while others will be downloaded into the system, eg from the MPEG data stream or from other ports as required.

The virtual machine 41 includes, in addition to the run time engine 40, some resident library functions 45 which include a toolbox 46. The library contains miscellaneous functions in C language used by the engine 40. These include data manipulation such as compression, expansion or comparison of data structures, line drawing, etc. The library 45 also includes information about device drivers 49 in the firmware of the receiver/decoder, such as hardware and software version numbers and available RAM space, and a function used when downloading a new device 47. Functions can be downloaded into the library and stored in FLASH or RAM memory.

The run time engine 40 is coupled to a device manager 48 which is coupled to a set of devices 47 which are coupled to device drivers 49 which are in turn coupled to the ports or interfaces. In broad terms, a device driver can be regarded as defining a logical interface, so that two different device drivers may be coupled to a common physical port. A device will normally be coupled to more than one device driver; if a device is coupled to a single device driver, the device will normally be designed to incorporate the full functionality required for communication, so that the need for a separate device driver is obviated. Certain devices may communicate among themselves.

As will be described below, there are three forms of communication from the devices 47 up to the run time engine: by means of variables, buffers, and events which are passed to a set of event queues.

Each function of the receiver/decoder is represented as a device 47. Devices can be either local or remote. Local devices include smartcards, SCART connector signals, modems, serial and parallel interfaces, a MPEG video and audio player and an MPEG section and table extractor. Remote devices executed in a remote location, differ from local devices in that a port and procedure must be defined by the system authority or designer, rather than by a device and device driver provided and designated by the receiver/decoder manufacturer.

The run time engine 40 runs under the control of the microprocessor and a common application programming interface. They are installed in every receiver/decoder so that all receiver/decoders are identical from the application point of view.

The engine 40 runs applications 43 on the receiver/decoder. It executes interactive applications and receives events from outside the receiver/decoder, displays graphics and text, calls devices for services and uses functions of the library 45 connected to the engine 40 for specific computation.

The run time engine 40 is an executable code installed in each receiver/decoder, and includes an interpreter for interpreting and running applications. The engine is adaptable to any operating system, including a single task operating system (such as MS-DOS). The engine is based on process sequencer units (which take various events such as a key press, to carry out various actions), and contains its own scheduler to manage event queues from the different hardware interfaces. It also handles the display of graphics and text. A process sequencer unit comprises a set of action-groups. Each event causes the process sequencer unit to move from its current action-group to another action-group in dependence on the character of the event, and to execute the actions of the new action-group.

The engine 40 comprises a code loader to load and download applications 43 into the receiver/decoder memory. Only the necessary code is loaded into the RAM or FLASH memory, in order to ensure optimal use. The downloaded data is verified by an authentication mechanism to prevent any modification of an application 43 or the execution of any unauthorized application. The engine 40 further comprises a decompressor. As the application code (a form of intermediate code) is compressed for space saving and fast downloading from the MPEG stream or via a built-in receiver/decoder mode, the code must be decompressed before loading it into the RAM. The engine 40 also comprises an interpreter to interpret the application code to update various variable values and determine status changes, and an error checker.

Before using the services of any device 47, a program (such as an application instruction sequence) has to be declared as a "client", that is, a logical access-way to the device 47 or the device manager 48. The manager gives the client a client number which is referred to in all accesses to the device. A device 47 can have several clients, the number of clients for each device 47 being specified depending on the type of device. A client is introduced to the device 47 by a procedure "device: Open Channel". This procedure assigns a client number to the client. A client can be taken out of the device manager 48 client list by a procedure "Device: Close Channel".

The access to devices 47 provided by the device manager 48 can be either synchronous or asynchronous. For synchronous access, a procedure "Device: Call" is used. This is a means of accessing data which is immediately available or a functionality which does not involve waiting for the desired response. For asynchronous access, a procedure "Device: I/O" is used. This is a means of accessing data which involves waiting for a response, for example scanning tuner frequencies to find a multiplex or getting back a table from the MPEG stream. When the requested result is available, an event is put in the queue of the engine to signal its arrival. A further procedure "Device. Event" provides a means of managing unexpected events.

As noted above, the main loop of the run time engine is coupled to a variety of process sequencer units, and when the main loop encounters an appropriate event, control is temporarily transferred to one of the process sequencer units.

Thus, it can be seen that the computer system implemented in the processor 20 provides a platform having considerable flexibility in enabling an application to communicate with a variety of devices.

Returning to FIG. 2, the processing of sound and image data by each of the associated processors will now be described in detail. In the case of received audio and video signals, the MPEG packets containing these signals will be demultiplexed and filtered so as to pass real time audio and video data in the form of a packetised elementary stream (PES) of audio and video data to dedicated audio and video processors or decoders 33, 34. The converted output from the audio processor 33 passes to a preamplifier 35 and thereafter via the audio output of the receiver/decoder. The converted output from the video processor 34 passes via a graphic processor 36 and PAL/SECAM encoder 37 to the video output of the receiver/decoder. The video processor may be of a conventional type, such as the ST 3520 A of SGS Thomson.

The graphic processor 36 additionally receives graphic data for display (such as generated images etc) from the central processor 20 and combines this information with information received from the video processor 34 to generate a screen display combining moving images together with overlaid text or other images. An example of a graphic processor adapted to carry out this sort of operation is the CL 9310 of C-CUBE.

In the case of received teletext and/or subtitle data, the conversion of the real time PES data to generate the appropriate images may also be handled by dedicated processors. However, in most conventional systems, this is handled by the general processor 20.

In point of fact, many of functions associated with the elements such as the graphic processor 36, video decoder 34, central processor 20 etc. may be combined or divided out in a number of ways, e.g. to integrate the central and graphic processors to form a single processor means etc.

Figure 4:
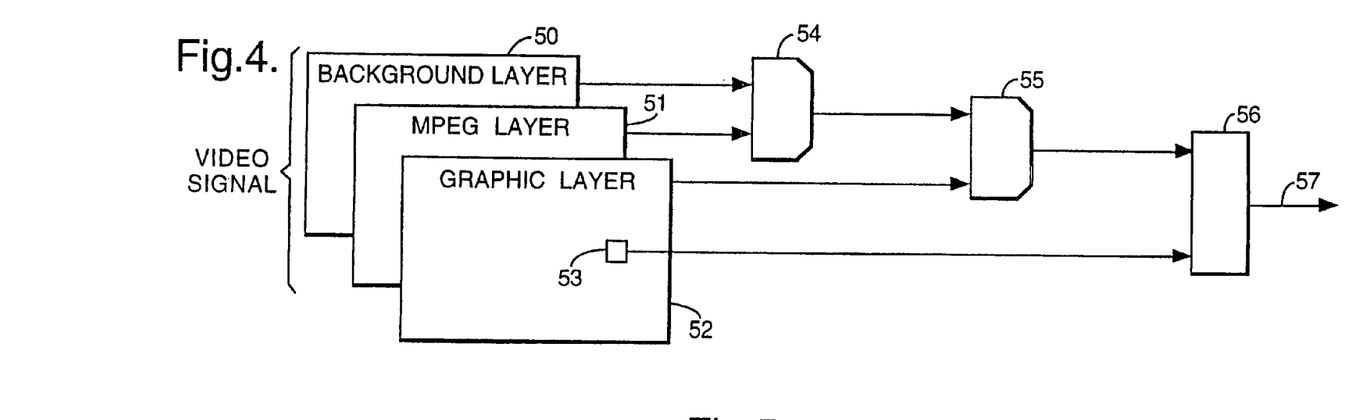
FIG. 4 shows in layer form the image data processed by the graphic processor of FIG. 2.

Referring now to FIG. 4, the functionality of the graphic processor 36 will now be described. As discussed above, the graphic processor receives and processes real time video data from the video decoder 34 together with graphic data received from the general processor 20 in order to generate an overlaid screen display.

As shown in FIG. 4, the graphic processor 36 is adapted to process input data divided into four distinct layers; a background layer 50, an MPEG layer 51, a graphic layer 52 and a cursor layer 53. As will be understood, the background layer 50 corresponds to the lowest layer of the screen display, the other layers being progressively superimposed with varying degrees of translucency or opacity over this layer.

In the case where the decoder is configured to display a broadcast video signal, the background and MPEG layers 50, 51 correspond to the stream of data received from the video decoder 34, the layer 50 corresponding to MPEG still pictures received from the decoder 34 and the layer 51 corresponding to a moving video MPEG signal received from the decoder. The division of a video signal into a fixed and a changing part is a known characteristic of MPEG compression. Other configurations of the decoder are possible, for example, where the background and MPEG layers 50, 51 are completed by picture data in any number of formats received from the processor 20. For example, in the case where the decoder is acting in web browser configuration, the processor 20 may supply still and/or moving picture data to complete the layers 50, 51. The layer 50 may equally correspond, for example, to a background colour and the layer 51 to one or more windows displayed over the background and containing, for example, information, moving icons or the like. The operation of the system in handling picture data will be discussed in more below with reference to FIGS. 5 and 6.

Still and moving image data from the background and MPEG layers 50, 51 are mixed together by the graphic processor 36, as represented by the element 54, and a combined output provided. Mixing of the MPEG layer information 51 over the background layer 50 by the graphic processor may carried out using a so-called alpha blending factor to permit a greater or lesser degree of translucency of the pixels in the MPEG layer image. In the case of a moving video image received from the video decoder 34, the same blending factor is used for all pixels within the video sequence. In the case of picture data from the central processor 20, the value of the blending factor for the layer 51 may be different for different parts of the screen.

The graphic layer 52 is used for texts, shapes, icons etc that will be displayed on the screen over the images taken from the layers 50, 51, for example, to permit display of a moving icon or the like generated by the processor 20 over a real-time video sequence taken from the video decoder 34.

In a similar manner to the blending carried out for the layers 50, 51, the element 55 carries out a blending of the graphic layer 52 with the combined output of the layers 50, 51. Different regions within the graphic layer 52 may be assigned a different blending factor and a corresponding different level of translucency depending on the characteristics of the data within each region.

A final layer, the cursor layer, is shown at 53 and represents an opaque cursor image, generated by hardware under control of the central processor 20 and superimposed over all the previous layers. As shown at 56, this layer is combined with the summed output from the combination of all previous layers to generate a final combined output 57 sent to the encoder 37 for subsequent display. Unlike the previous layers, the cursor presents a continuously opaque appearance and is superimposed over the combined layers without any blending.

Figure 5:
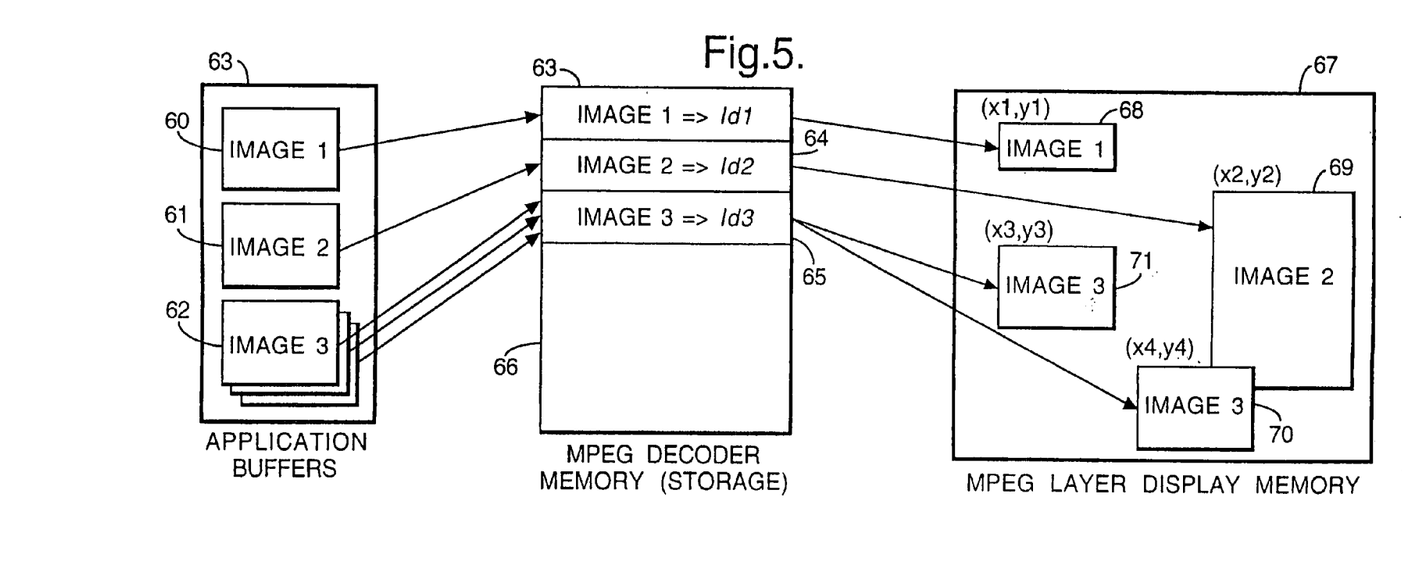
FIG. 5 shows the operations carried out in memory for picture data to be displayed in the MPEG layer of FIG. 4.
Figure 6:
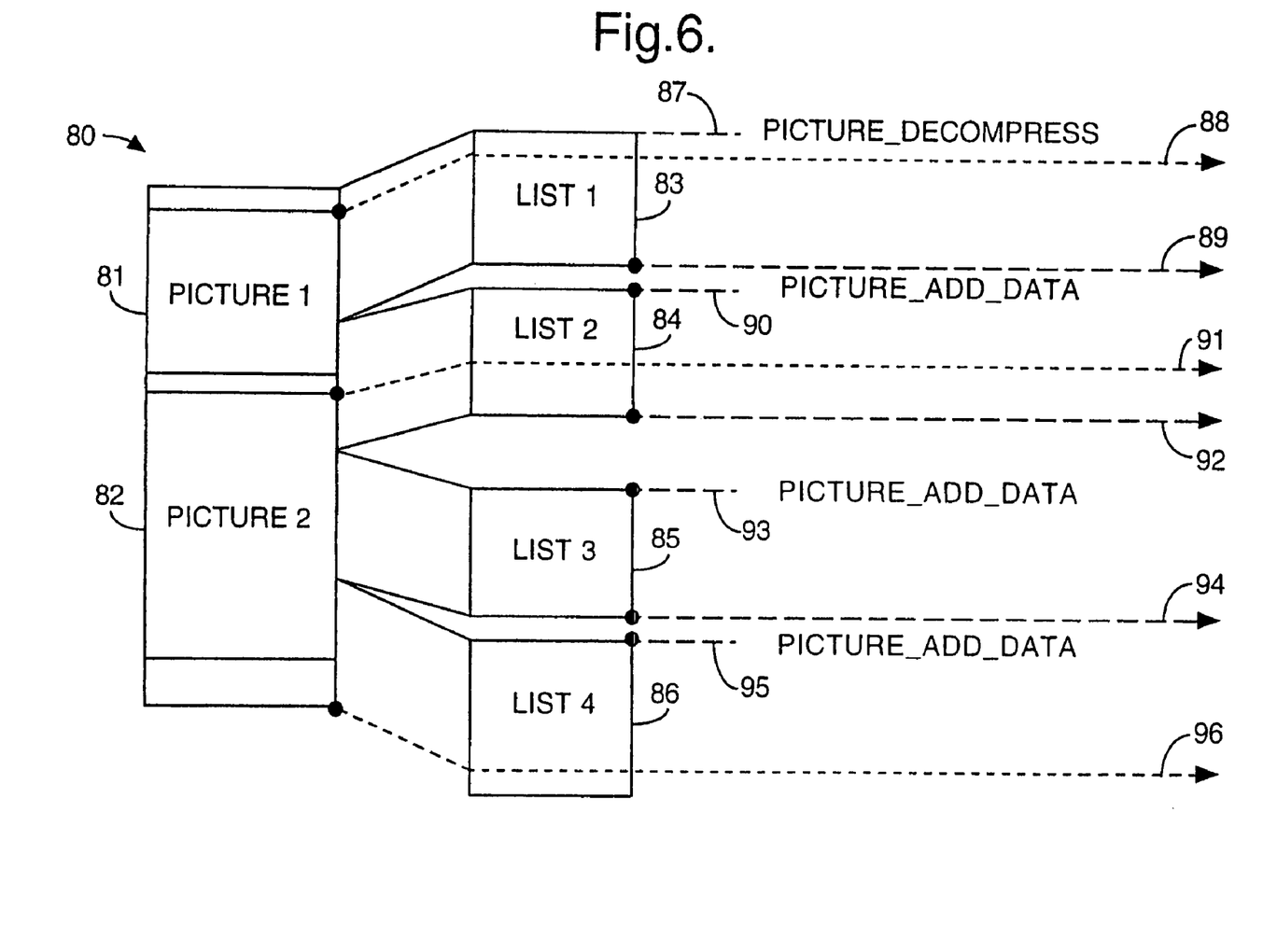
FIG. 6 shows the operations carried out in memory for the partial display of picture data in the MPEG layer.

Referring to FIGS. 5 and 6, the operation of a device 47 of the kind shown in FIG. 3 and adapted to decompress and display downloaded picture images in the MPEG layer 51 will now be described. In the following description, the term picture is used to describe a compressed digital image. Typically, the sorts of picture formats used may include MPEG still picture, JPEG format picture, PNG format picture, GIF format picture, etc.

Whilst the following description will concentrate on the processing and display of a single picture, a sequence of still pictures may be displayed one after the other in order to generate a moving image sequence.

Referring to FIG. 5, downloaded compressed picture data 60, 61, 62 is initially stored in a buffer section of the RAM memory of the decoder indicated at 63. This buffer memory may be of a type initialised and managed by a high level application 43 responsible for decoding and displaying images, or an area of memory handled by the device manager 48 shown in FIG. 3.

Each type of picture file or group of picture files includes a header indicating the picture file format (GIF, MPEG, etc.) as well as the information needed to decompress the picture file. For example, a GIF format file 62 comprising more than one picture has a global header describing the size of the overall area where the two decompressed images will be displayed and a specific header for each picture describing its size and location coordinates within the overall area.

Following downloading of a compressed picture into the buffer section 63 of the memory, a decompression of the picture data will be effected by the device in response to a command PICTURE_DECOMPRESS received from the application. The subsequently decompressed image data 63, 64, 65 is stocked in a separate storage section of the RAM memory indicated at 66 and reserved for image data eventually to be displayed in the MPEG layer. Each decompressed image or image sequence is given an image identity reference Id1, Id2, Id3 by the device, this ID value being supplied to the high level application and used for all subsequent operations to be carried out on this data.

Unlike the compressed picture data temporarily held in the application buffer 63, the decompressed image data 63, 64, 65 may be held indefinitely in the storage memory 66 until such time as the application decides to delete the information.

The storage of decompressed image data in a distinct assigned memory area permits the data to be manipulated in a number of ways prior to display. For example, a resizing of the image may be carried out, either by the device itself, the device manager or by a higher level application. Equally, the image may be duplicated in order to be displayed at a number of positions on the screen. Conversion of colour data associated the image, for example to compensate for limitations in the functionality of the graphic processor, may also be carried out on the image.

Modified or unmodified data stored in the memory 66 is passed, in response to a command PICTURE_DISPLAY from the application, into a separate RAM memory section 67 assigned for images to be displayed in the MPEG layer 51 (see FIG. 2). The size of the display memory 67 corresponds to the screen area. As shown, the images Id1 and Id2 are displayed at 68 and 69, whilst the image or sequence of images Id3 is duplicated and displayed at the positions 70, 71. The information in the memory section 67 is fed to the graphic processor 36 in order to create the MPEG layer 51, as shown in FIG. 2.

In addition to the transfer of image information between the storage area 66 and display area 67, a second transfer may also be carried out to copy information held in the storage area 66 into a memory area (not shown) associated with the display of images in the background layer 40 of FIG. 2. For example, a single image may be replicated and displayed a number of times in the background layer in order to cover the screen in a tiling manner. The information stored in the memory area associated with the background layer is accessed by the graphic processor in the same manner as the MPEG display area 67.

As will be understood, the memory sections 63, 64, 65 do not need to physically correspond to uninterrupted memory zones in a single RAM or other memory element. In particular, the memory area 63 may be divided between a number of buffers. FIG. 6 shows the steps associated with the decompression of a file 80 containing two compressed pictures 81, 82 previously downloaded into four associated buffer elements or lists of buffers 83, 84, 85, 86.

Each buffer list corresponds to the buffer areas in which a block of data has been downloaded from the MPEG stream. The buffer list itself may designate a number of separate buffer areas depending on availability as the information is downloaded.

At step 87, the application sends a PICTURE_DECOMPRESS command 87 to start the decompression process. The device allocates a group image Id and starts read the buffers. Once the start of a picture is found at step 88, the device assigns an image Id and starts decompression of the image. At step 89, the end of the first buffer list is reached and the application sends a PICTURE$_{13}$ ADD_DATA command at step 90 to command the device to read the next buffer list in the series.

At this point, only part of the image of the first picture 81 has been decompressed and stored in the memory storage area 66. The application may nevertheless decide to immediately transfer the partial image to the display memory area 67.

The decompression of the remaining part of the picture 81 then continues until the start of the next picture is found at 91. At this point, the whole of the first picture 81 has been decompressed and stored in the memory area 66. The application may then update the contents of the display memory area 67 by copying the complete image into the display area 67. In this way, the whole of the first picture 81 may be displayed before the second picture has been decompressed.

At step 92, the device informs the application of the end of the second buffer list 84 and the application sends a second PICTURE_ADD_DATA command 93 to start the reading of the next buffer list 85. The process is repeated at the end of the third buffer list 85 and beginning of the fourth buffer list 86 by the steps 94, 95. Again, each time the end of a buffer is reached at 92, 94, the application may copy the data that has already been decompressed from the storage area 66 into the display area 67.

At step 96, the end of the file is reached and both the pictures 81, 82 have been decompressed and loaded into the storage memory 66. At this point, the device informs the application of the successful decompression of the whole file and the application again copies the contents of the storage memory 66 into the display memory 67 to display the complete set of pictures.

The invention claimed is:

1. A decoder for a digital audiovisual transmission system, the decoder including:
   a processor for decompressing and displaying compressed still picture data;
   a memory comprising a storage memory for receiving from the processor decompressed data representing a plurality of still picture images and for storing the received decompressed data; and
   at least one display memory configured to hold contemporaneously data representing multiple still picture images readable by the processor prior to display, the data representing the plurality of still picture images being copied from the storage memory to the display memory for subsequent display,
   wherein said storage memory and said processor are configured to maintain decompressed data corresponding to at least one still picture image in said storage memory after removal of said at least one still picture image from said display memory.

2. A decoder as claimed in claim 1 in which the processor is configured to process image data in the display memory as one layer amongst a plurality of layers superimposed one over the other when displayed.

3. A decoder for a digital audiovisual transmission system, the decoder including:
   a processor for decompressing and displaying compressed still picture data;
   a memory, characterised in that the memory comprises a storage memory allocated to receive from the processor decompressed data representing a plurality of still picture images; and
   at least one display memory adapted to hold contemporaneously data representing multiple still picture images readable by the processor prior to display, the data representing the plurality of still picture images being copied from the storage memory to the display memory for subsequent display,
   in which the processor is adapted to process image data in the display memory as one layer amongst a plurality of layers superimposed one over the other when displayed, and
   in which the processor is adapted to display the image data in the display memory in a layer normally used by the processor to display broadcast audiovisual information.

4. A decoder for a digital audiovisual transmission system, the decoder including:
   a processor for decompressing and displaying compressed still picture data;
   a memory, characterised in that the memory comprises a storage memory allocated to receive from the processor decompressed data representing a plurality of still picture images; and
   at least one display memory adapted to hold contemporaneously data representing multiple still picture images readable by the processor prior to display, the data representing the plurality of still picture images being copied from the storage memory to the display memory for subsequent display,
   in which the memory comprises a second display memory readable by the processor and corresponding to a second layer of displayed image data, data being copied from the storage memory to the second display memory for subsequent display in the second layer of image data.

5. A decoder as claimed in claim 1, further comprising buffer memory means for storing compressed digital picture data prior to decompression by the processor.

6. A decoder as claimed in claim 5, in which the buffer means comprises a plurality of buffer memory elements.

7. A decoder as claimed in claim 1, in which the processor is configured to decompress picture data sent in a compression standard that uses a color look-up table.

8. A decoder as claimed in claim 1, in which the processor is configured to decompress picture data sent in a compression standard that uses a red/blue/green color value associated with each pixel.

9. A decoder as claimed in claim 1 in which the processor comprises a general processor for decompressing digital picture data and a graphic processor for preparing the decompressed data for display.

10. A method of digital image processing in a decoder for a digital audiovisual transmission system, the decoder comprising:
    a processor for decompressing and displaying compressed still picture data, wherein the decompressed digital image data representing a plurality of still picture images received from the processor is transmitted to a storage memory for storage therein and from which said decompressed digital image data is copied to a display memory which holds contemporaneously data representing said multiple picture images, the data being read by the processor for subsequent display of such multiple picture images, wherein decompressed data corresponding to at least one still picture image remains stored in said storage memory after removal of the at least one still picture image from said display memory.

11. A decoder as claimed in claim 1, wherein the display memory is configured to hold digital image data representing the plurality of still pictures that have been modified or duplicated during copying.

12. A decoder as claimed in claim 4, wherein the second display memory is configured to hold digital image data representing the plurality of still pictures that have been modified or duplicated during copying.

13. A decoder as claimed in claim 1, wherein the display memory is configured to hold partial image data copied from the storage memory so as to permit display of part of an image.

14. A decoder as claimed in any claim 1, further comprising a high level application running on the processor for controlling the copying of image data from the storage memory into a first or second display memory.

15. A decoder as claimed in claim 14, wherein the application is configured to control the deletion of decompressed data from the storage memory.

16. A decoder as claimed in claim 6, wherein the processor is configured to control decompression and transfer of image data from the buffer memory elements to the storage memory, and from the storage memory to a display memory, such that image information present in the storage memory is transferred to the display at the end of the decompression of the contents of each buffer element.

17. A decoder as claimed in claim 1, wherein the processor is configured to control the decompression and transfer of a group of images in a single image file from the buffer memory to the storage memory, and from the storage memory to a display memory, such that image information is transferred from the storage memory to the display memory at the end of the decompression of each image in the image file.

18. A method as claimed in claim 10, wherein digital image data copied from the storage memory into the display memory is modified or duplicated during the copying.

19. A method as claimed in claim 10, wherein the image data in the display memory is processed as one layer amongst a plurality of layers superimposed one over the other when displayed.

20. A method as claimed in claim 17, wherein the image data in the display memory is displayed in a layer normally used by the processor to display broadcast information.

21. A method as claimed in claim 10, wherein the digital image data is copied from the storage memory to a second display memory of the memory for subsequent display in a second layer of displayed image data.

22. A method as claimed in claim 19, wherein the digital image data copied from the storage memory to the second display memory is modified or duplicated during the copying.

23. A method as claimed in claim 10, wherein partial image data is copied from the storage memory to a display memory so as to permit display of part of an image.

24. A method as claimed in claim 10, wherein image data is copied from the storage memory into a first or second display memory under control of a high level application running on the processor.

25. A method as claimed in claim 10, wherein compressed digital picture data is stored in a buffer memory means prior to decompression by the processor.

26. A method as claimed in claim 25, wherein the buffer memory means comprises a plurality of buffer memory elements.

27. A method as claimed in claim 26, wherein decompression and transfer of image data from the buffer memory elements to the storage memory, and from the storage memory to a display memory, is controlled by the processor such that image information present in the storage memory is transferred to the display at the end of the decompression of the contents of each buffer element.

28. A method as claimed in claim 10, wherein decompression and transfer of a group of images in a single image file from the buffer memory to the storage memory, and from the storage memory to a display memory, is controlled by the processor such that image information is transferred from the storage memory to the display memory at the end of the decompression of each image in the image file.

29. A method as claimed in claim 10, wherein picture data sent in a compression standard that uses a color look-up table is decompressed.

30. A method as claimed in claim 10, wherein picture data sent in a compression standard that uses a red/blue/green color value associated with each pixel is decompressed.

* * * * *